Figure 1:
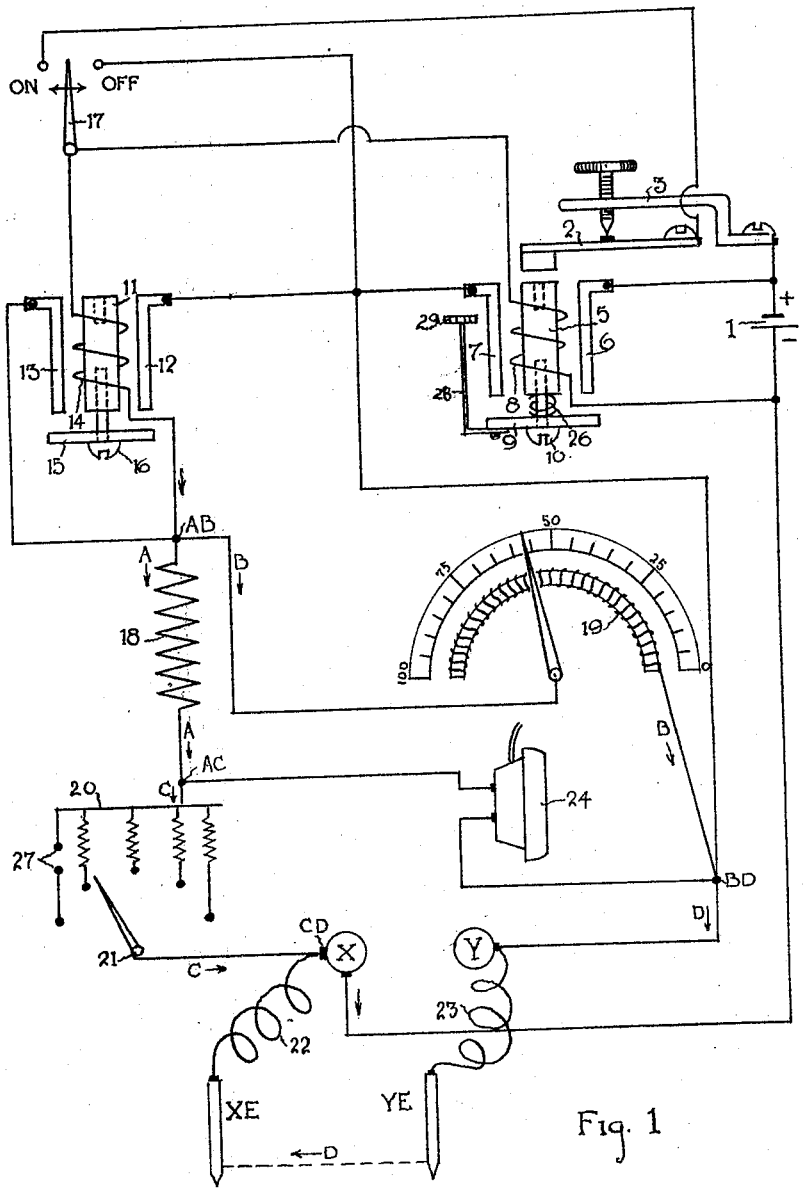

Sept. 6, 1932.  S. W. BORDEN  1,876,324
GROUND RESISTANCE METER
Filed Aug. 1, 1929

Stephen W. Borden
INVENTOR.

Patented Sept. 6, 1932

1,876,324

UNITED STATES PATENT OFFICE

STEPHEN W. BORDEN, OF SUMMIT, NEW JERSEY

GROUND RESISTANCE METER

Application filed August 1, 1929. Serial No. 382,753.

The present invention relates to electrical measuring instruments, and is particularly concerned with meters of the bridge type specially designed for measuring the resistance value of earth electrodes.

The object of the invention is to provide an improved arrangement of the bridge arms and the connections between the bridge proper and the source of energy so that the operating current for the bridge has better characteristics and is of much greater magnitude than that heretofore employed in this connection. A further object of the invention is to provide bridge parts, of such character and so arranged, that the interference resulting from the presence of a foreign potential across the electrodes to which the meter may be connected will be reduced to a minimum. A further object of the invention is to provide automatic short-circuiting means which will protect the meter against burn outs from sources of potential exterior to the meter.

The drawing is schematic only and is intended to show the component parts and their arrangement (electrically) with respect to each other.

In Fig. 1. 1 is a battery consisting of one or more cells. 2 is the spring portion and 3 is the stationary portion of an interruptor unit. 5 is the iron core and 6 and 7 are metal angle pieces of an electromagnet of which 8 is the winding. 9 is an iron washer suspended from the core 5 by the screw 10. Parts 11–16 inclusive are similar to 5–10 inclusive. 17 is an "on" and "off" switch. Parts 18, 19 and 20 are bridge arms, 18 being a fixed resistance, 19 a variable resistance in the form of a rheostat and 20 a group of resistances connected to the multiplier switch 21. X and Y are binding posts adapted to receive the connecting leads 22 and 23 from the earth electrodes XE and YE, the resistance of which is to be measured. 24 is a detecting device for balancing the bridge. 26 is a compression spring which prevents armature 9 contacting with poles 6 and 7, by gravity, when the meter is inverted. 27 is a pair of binding posts to which any desired resistance unit may be connected without disturbing any of the permanent connections of the meter. 28 is a reset lever and visual indicator of the position of armature 9, the head 29 being located on top of the face plate of the meter.

Parts 6, 7, 12 and 13 are iron angle pieces, each piece being approximately the width of the magnet so that the magnet is enclosed in metal on two opposite sides and two sides are not enclosed or, in other words, the magnet is partly iron clad. While I show this as the preferred form it is understood that the extent of the enclosure for the magnet winding is optional to a large degree and may, in fact, be omitted entirely if the magnet is made sufficiently powerful to otherwise operate a suitable armature serving as a contacting device. The particular form shown has been adopted as preferable because it is relatively inexpensive to construct, is substantial and constitutes a degree of magnetic enclosure which gives satisfactory operating characteristics to the interruptor and also to the bridge current, as more fully explained later.

The detector 24 may be in the form of a telephone receiver, a galvanometer or any suitable device for detecting the absence of current in the circuit.

While an ordinary interruptor containing the usual parts 2 and 3 is shown it is understood that any suitable interrupting device may be employed and the magnet for operating the contact 9 may be distinct from the interrupting device.

With the connections as in Fig. 1 and the starting switch in the "on" position the current from battery 1 passes through the interruptor parts 2 and 3 to the switch 17 where it divides, a portion returning through the magnet 8 to the battery 1 and a portion passing through the magnet 14 to the point AB, where it divides and passes through the multiple circuits of the bridge proper, uniting again at the point CD and returning thence to the battery 1.

The current which flows through magnet 8 causes the magnet to attract the armature 2 thus breaking contact with the part 3 and interrupting the current both to magnet 8 and to the bridge. When the battery current to magnet 8 is interrupted the energy stored in the magnetic field of magnet 8 is discharged through magnet 14 and the bridge proper or, in other words, the magnet 8 acts as a "kick" coil supplying a relatively high potential to the bridge circuit. When the parts 2 and 3 are in contact the bridge proper is connected directly across the battery but with no resistance in series except the resistance of the magnet winding 14, which is made relatively very small and when the resistance in the rheostat 19 is also small, which is the case when balancing the bridge for small resistances, the total resistance of the bridge circuit is relatively small with the result that a relatively heavy current flows from battery 1 through the bridge circuit. With one-half ohm resistance in the electrodes XE and YE the total resistance of the bridge circuit, plus the magnet 14, may not exceed one ohm and the flow of current from a single cell of battery, with the interruptor operating, may be as large as 2/10 of an ampere while the current used ordinarily for bridge operation generally does not exceed a few milliamperes.

In addition to the bridge current being of unusual magnitude it is also of unusual and peculiar wave form. The current which flows through the bridge directly from the battery is a pulsating current of substantially square wave form. Superimposed on this current is the "kick" current from the magnet 8, and while this current is small, it flows from a relatively high potential source and its magnitude is considerable, as compared with the flow of current from the battery direct, when the resistances in the bridge arms C and D are of high values. The current, however, is at all times uni-directional but of a pulsating character and of a wave form particularly well suited to the use of a device of the diaphragm type, such as a telephone receiver, for detecting purposes, but its character also permits the use of either a direct current or an alternating current galvanometer.

As to the arrangement of the bridge circuits it will be noted that the operating circuit is connected to the points AB and CD and the detector is connected between the points AC and BD, while the usual practice has been to connect the operating circuit to AC and BD and the detector between AB and CD. The arrangement shown in the drawing has a very distinct advantage where there is a source of foreign potential on the electrodes XE and YE. The bulk of the current which will flow, due to the external potential, will pass from binding post X through magnets 8 and 14 to point AB on the bridge, the resistance of this circuit always being relatively small as compared to the resistance in the arms C and A, and from point AB it passes through the rheostat 19 to binding post Y and it will be observed that the rheostat 19 is in multiple with detector 24. The result of this is two-fold: first, the detector 24 is protected against being subjected to any potentials which may result in injuring the windings or demagnetizing the magnets, and secondly, the foreign current has minimum power of interference with the operation of the bridge and may be reduced by selecting a point on the multiplier switch which will cause a relatively low reading on the rheostat 19 under which conditions the detector 24 is nearly short-circuited, so far as the foreign current is concerned.

The method of using the meter described is as follows. The binding posts X and Y are connected to two earth electrodes XE and YE respectively. One of these, such as electrode XE, may be the electrode whose resistance it is desired to determine and the other electrode YE may be an electrode of known or negligible resistance, such as a general water piping system. With the electrodes connected, the switch 17 is turned to the "on" position and the multiplier switch 20 and the rheostat 19 are adjusted until the detector 24 is silent, when the position of the pointer of rheostat 19 indicates the resistance connected between the binding posts X and Y.

When measuring the resistances of earth electrodes which are actually in service it sometimes happens that the meter is connected to electrodes between which there exists a potential of some magnitude. This potential may be almost anything up to the full potential of the system to which the electrode is connected and consequently a current may flow through the windings of the meter of sufficient magnitude to injure them and in order to prevent such injury I provide automatic short-circuiting devices.

Referring to Fig. 1. A source of foreign current entering the meter at X and leaving it at Y flows from X through the magnet winding 8 to the switch 17 and if switch 17 is in the "off" position it flows thence to Y. It will be seen that the only equipment in this circuit is the magnet winding, 8. If the foreign current is of sufficient magnitude to endanger the magnet winding 8 it will cause the magnet 5 to attract the armature 9 against the pole pieces 6 and 7 with the result that the battery 1 will be connected directly to the terminals X—Y and since the battery 1 is of very low resistance practically all of the foreign current will be shunted out of the meter windings. It will be seen that the magnet winding 8 is now also connected directly across the terminals of the battery and the battery current holds the armature 9 in the closed position although there is now no appreciable amount of foreign current flowing through the magnet. If the magnet were not connected across the battery the armature 9 would not stay in the closed position since it short-circuits the magnet, so far as the foreign current is concerned, and it would simply act as a vibrator creating an arc between itself and the pole pieces and failing to perform the short-circuiting functions desired. When the armature 9 has been attracted against the pole pieces 6 and 7 it will ordinarily stay in the closed position, even though the source of foreign current be entirely disconnected, but it will ordinarily release itself when the switch 17 is thrown to the "on" position since the battery current is now forced to flow through the interruptor. In any case it may be released by depressing the knob 29.

The magnet 8 serves to operate the interruptor spring 2 thus providing the normal pulsating current for the bridge. It is connected directly across the battery when the interruptor parts 2 and 3 are in contact and it is necessary that the armature 9 be placed sufficiently far away from the pole pieces so that it will not be attracted by this normal operating magnetism. In addition a small tension spring, 26, is necessary to prevent armature 9 making contact when the meter is turned upside down as in transportation or storage. These requirements are such that when armature 9 is properly adjusted an alternating current flowing from a foreign source through the magnet 8 must have a magnitude of approximately five amperes in order to insure the proper operation of armature 9 when the meter is in the "on" position.

With the meter in the "on" position the path of a foreign current would be from the binding post X through the magnet 8 to the switch 17 thence through the magnet 14 to point AB and thence through rheostat 19 to binding post Y thus endangering rheostat 19. It is not feasible to construct rheostat 19 with a carrying capacity as great as five amperes and it is much more economical to construct this rheostat with a carrying capacity of say one-half ampere and to provide a second short-circuiting device, as armature 15, to short-circuit the rheostat when the current reaches sufficient proportions to endanger the same. The armature 15 is adjusted to operate at approximately three-tenths of an ampere alternating current and when the current exceeds that amount, but is not of sufficient magnitude to operate the armature 9, the armature 15 will be locked against the pole pieces 12 and 13 thus short-circuiting rheostat 19. If the current exceeds the amount necessary to operate armature 9, armature 15 will be released due to the short-circuiting of winding 14 but since the foreign current is now shunted through the battery no injury will result to rheostat 19.

While it is possible by the use of a DPDT switch of suitable carrying capacity to short-circuit the posts X—Y by throwing the switch to the "off" position, such a switch would be relatively bulky and expensive. Furthermore with such an arrangement the operator would have no warning of the fact that a foreign current was flowing through the meter until he switched the meter "on". This is objectionable since he necessarily subjects himself to a possibly dangerous shock and furthermore the condition might be allowed to continue for a more or less extended period while he is preparing his record blanks or is otherwise engaged, with the possibility of a resulting burn out. With the arrangement which I provide the operator has immediate notice of the presence of a foreign current, while the meter is still switched "off", either by the noise from the vibrator which will be operating unexpectedly (since the meter is switched off) or by the very substantial noise made by the armature 9 as it strikes the pole pieces 6 and 7 and, in addition, the knob 29 will be raised above the face plate of the instrument giving a visual indication that the cut-out has operated.

So long as the meter is in the "off" position only a single cut-out is necessary but the meter must be protected against foreign currents which are present while the meter is switched "on". Such currents may originate while the meter is in the "on" position or an inexperienced operator may switch the meter "on" while a foreign current is flowing. When the meter is in the "on" position the single magnet 5 cannot be made to perform all the necessary functions even though it may be set to operate at a sufficiently low current to protect the rheostat 19. When the meter is in operation the winding 8 must necessarily be connected in series with the bridge as a whole and in order to give the necessary protection it would have to shunt the battery across the posts X—Y, short-circuit the entire bridge and also place its own winding 8 directly across the battery and it is not possible to have the magnet carry out all these functions with a single throw switching device such as armature 9 and pole pieces 6 and 7, and it is more economical, more feasible and more satisfactory generally to provide the second magnet 11, which is a duplicate of magnet 5, than to provide the more complicated and expensive switching device which would otherwise have to be substituted for magnet 5.

It will be observed that the windings 8 and 14 are not connected in the circuit between the bridge points CD and BD and therefore do not in any way effect the accuracy of the measurements as would be the case should a circuit breaker, magnet or fuse be connected directly in the bridge arm D or in series with the electrodes under test.

While it has proven to be economical and desirable to use the magnet 14 with its armature 15 for short-circuiting the rheostat 19 it is to be understood that this magnet is not essential and may be dispensed with if the rheostat 19 has sufficient current carrying capacity to safely carry that current which is necessary to cause the magnet 8 to operate a suitable switching mechanism. It is also to be understood that while, in the preferred form, magnet 8 serves the double purpose of actuating the armature 9 and the interruptor spring 12, separate and distinct magnets may be used for these two purposes. It is also to be understood that the particular arrangement of the equipment, which I have described, for supplying the current to the bridge circuits and also the short-circuiting devices for protecting the bridge against burn outs may be used in connection with measuring bridges of other types than the one described in this application. For instance, all of the special features disclosed in this application may be incorporated in a meter of the character described in my application, Serial #347,780.

In the actual construction of my meter the element 19 is in the form of a circular rheostat embracing nearly a complete circle and it is equipped with a scale which is divided into one hundred equal divisions. In the assembly of the meter the scale and the rheostat winding are so positioned that when the pointer is at 0 there will be no part of the rheostat in circuit. After obtaining this position the rheostat arm is revolved until the pointer is exactly on 100 and in this position the rheostat resistance, then in circuit, is measured and the fixed resistance 18 is calibrated to exactly match this rheostat resistance. The result of this is that the bridge will be balanced when the pointer of rheostat 19 is on 100 and the resistance between the binding posts X and Y is equal to the resistance in the multiplier arm C or in other words the full scale reading will be the same as the resistance in arm C, from which it is apparent that the full scale reading of the meter may be made of any desired value by connecting a resistance of the said desired value between the binding posts 27 and turning the multiplier switch 21 to the corresponding contact.

If the short-circuit switch 9 be omitted, magnet 11 will still continue to function properly and when armature 15 closes the circuit between the poles 12 and 13 the windings 14 and 8 are then connected, in series, across the posts X and Y thus forming a relatively low resistance shunt to the meter as a whole and the amount of protection afforded against burn outs will depend upon the current carrying capacity of the windings 14 and 8. Inasmuch as these windings are normally of very substantial carrying capacity there is a very considerable amount of protection afforded by the use of a single short-circuiting device connected as is magnet 11.

What I claim is:—

A bridge for measuring the ohmage of a resistance, which includes four bridge arms, C, A, B, and D, the last being the resistance to be measured, the four arms being connected in closed series, in the order mentioned; a battery having one terminal, connected to the junction of arms C and D, and its other terminal connected to the junction of arms A and B; a current detector connected between the junction of arms A and C and the junction of arms B and D; and an electromagnetic circuit-closing device, having its operating winding connected between the first mentioned battery terminal and the junction of arms A and B, said device functioning to close a circuit between the said battery terminal and the junction of arms B and D.

In testimony whereof I have signed my name to this specification.

STEPHEN W. BORDEN.